United States Patent
Willis et al.

(10) Patent No.: US 9,180,369 B2
(45) Date of Patent: Nov. 10, 2015

(54) METHOD AND SYSTEM SUPPORTING AUDITED REPORTING OF ADVERTISING IMPRESSIONS FROM VIDEO GAMES

(75) Inventors: Daniel Willis, Stittsville (CA); Gordon Freedman, Ottawa (CA)

(73) Assignee: Google Inc., Mountain View, CA (US)

( * ) Notice: Subject to any disclaimer, the term of this patent is extended or adjusted under 35 U.S.C. 154(b) by 1735 days.

(21) Appl. No.: 11/397,733

(22) Filed: Apr. 5, 2006

(65) Prior Publication Data

US 2006/0224455 A1  Oct. 5, 2006

Related U.S. Application Data

(60) Provisional application No. 60/668,080, filed on Apr. 5, 2005.

(51) Int. Cl.
*G06Q 30/02* (2012.01)
*A63F 13/40* (2014.01)
*A63F 13/30* (2014.01)

(52) U.S. Cl.
CPC ........... *A63F 13/10* (2013.01); *A63F 13/12* (2013.01); *G06Q 30/02* (2013.01); *G06Q 30/0241* (2013.01); *G06Q 30/0248* (2013.01); *G06Q 30/0264* (2013.01); *A63F 2300/532* (2013.01); *A63F 2300/5506* (2013.01)

(58) Field of Classification Search
CPC ....... G06Q 30/00; G06Q 99/00; G06Q 30/02; G06Q 30/0241; G06Q 30/0248
USPC ........ 705/14, 14.12, 14.5, 26.1, 14.41, 14.66; 709/219; 717/173; 718/105; 463/42, 463/31, 43; 707/3; 725/42
See application file for complete search history.

(56) References Cited

U.S. PATENT DOCUMENTS

| | | | |
|---|---|---|---|
| 5,740,549 A | 4/1998 | Reilly et al. | |
| 5,768,382 A | 6/1998 | Schneier et al. | |
| 5,946,664 A * | 8/1999 | Ebisawa | 705/14.5 |

(Continued)

FOREIGN PATENT DOCUMENTS

| | | |
|---|---|---|
| EP | 0 752 678 | 1/1997 |
| EP | 1137281 | 9/2001 |

(Continued)

OTHER PUBLICATIONS

High, Kamau. "Jonathan Epstein, Game On." Nov. 19, 2007, Adweek [online] [retrieved on Jan. 2, 2008]. Retrieved from the Internet <URL: http://www.adweek.com/aw/magazine/article_display.jsp?vnu_content_id=1003674403>.

(Continued)

*Primary Examiner* — Bennett Sigmond
*Assistant Examiner* — Marilyn G Macasiano
(74) *Attorney, Agent, or Firm* — Fish & Richardson P.C.

(57) ABSTRACT

A variety of processes for certifying the reporting of advertising impressions provided via video games are described. These certification processes optionally take advantage of automated techniques for verifying that when advertising data is provided a corresponding advertisement is provided within the video game. In addition, as software patches are often provided for video games, a recommended process for certifying patched software is also described. Reporting data associated with advertising impressions provided from uncertified video games is considered suspect and optionally discarded.

21 Claims, 13 Drawing Sheets

(56) References Cited

U.S. PATENT DOCUMENTS

| | | | |
|---|---|---|---|
| 6,036,601 A * | 3/2000 | Heckel | 463/42 |
| 6,430,301 B1 | 8/2002 | Petrovic | |
| 6,442,259 B2 | 8/2002 | Culli et al. | |
| 6,487,538 B1 * | 11/2002 | Gupta et al. | 705/14.66 |
| 6,640,336 B1 * | 10/2003 | Ebisawa | 717/173 |
| 6,704,415 B1 | 3/2004 | Katayama et al. | |
| 6,882,978 B2 * | 4/2005 | Ebisawa | 705/14.5 |
| 6,928,414 B1 * | 8/2005 | Kim | 705/14.5 |
| 7,047,302 B1 | 5/2006 | Chatani et al. | |
| 7,085,733 B2 * | 8/2006 | Ebisawa | 705/14.12 |
| 7,249,383 B1 | 7/2007 | McCully et al. | |
| 7,452,278 B2 | 11/2008 | Chen et al. | |
| 7,624,046 B2 * | 11/2009 | Galuten et al. | 705/26.1 |
| 8,589,227 B1 * | 11/2013 | Bridge et al. | 705/14.41 |
| 2001/0010059 A1 | 7/2001 | Burman et al. | |
| 2002/0059148 A1 | 5/2002 | Rosenhaft et al. | |
| 2002/0072413 A1 | 6/2002 | Arias et al. | |
| 2002/0082910 A1 | 6/2002 | Kontogouris | |
| 2002/0095675 A1 | 7/2002 | Lowthert et al. | |
| 2002/0116263 A1 | 8/2002 | Gouge | |
| 2003/0100375 A1 * | 5/2003 | Wakae et al. | 463/43 |
| 2003/0177187 A1 | 9/2003 | Levine et al. | |
| 2004/0015608 A1 | 1/2004 | Ellis et al. | |
| 2004/0043806 A1 | 3/2004 | Kirby et al. | |
| 2004/0073909 A1 * | 4/2004 | Arimilli et al. | 718/105 |
| 2004/0116183 A1 * | 6/2004 | Prindle | 463/42 |
| 2004/0128364 A1 * | 7/2004 | Clark | 709/219 |
| 2004/0143852 A1 | 7/2004 | Meyers | |
| 2004/0216157 A1 * | 10/2004 | Shain et al. | 725/42 |
| 2004/0221178 A1 | 11/2004 | Aaron et al. | |
| 2005/0098955 A1 | 5/2005 | Rasmussen | |
| 2005/0137015 A1 | 6/2005 | Rogers et al. | |
| 2005/0255923 A1 | 11/2005 | Aoki | |
| 2005/0262061 A1 * | 11/2005 | Moritsu et al. | 707/3 |
| 2007/0043616 A1 * | 2/2007 | Kutaragi et al. | 705/14 |
| 2008/0102947 A1 * | 5/2008 | Hays et al. | 463/31 |

FOREIGN PATENT DOCUMENTS

| | | |
|---|---|---|
| EP | 1 492 055 A2 | 12/2004 |
| JP | H10-290443 | 10/1998 |
| JP | 2002-083219 | 3/2002 |
| JP | 2002-288519 | 10/2002 |
| JP | 2002-318965 | 10/2002 |
| JP | 2004-054521 | 2/2004 |
| WO | WO 01/40948 | 6/2001 |

OTHER PUBLICATIONS

European Extended Search Report in Application No. 06721778.6-2221 / 1866832 PCT/CA2006000525 dated Mar. 9, 2010, 1-17 pages.

Spinellis, Diomidis, "Reflection as a Mechanism for Software Integrity Verification," ACM, New York, NY, ACM Transactions on Information and System Security, vol. 3, No. 1, Feb. 2000, Copyright 2000 ACM, 1094-9224/00/0200, XP000976015 ISSN: 1094-9224, pp. 51-62.

International Preliminary Report on Patentability from International Application No. PCT/CA2006/000525 mailed Oct. 18, 2007, 13 pages.

International Search Report from International Application No. PCT/CA2006/000525 mailed May 31, 2006, 2 pages.

Japanese Office Action dated May 10, 2011 for JP Patent Application No. 2008-504591, (with English translation), 10 pages.

EP Communication from European Patent Office mailed Feb. 2, 2012 from EP Application No. 06721778.6, 5 pages.

Japanese Office Action dated Jan. 4, 2012 from JP Application No. 2008-504591 (English translation), 2 pages.

CN Office Action from The State Intellectual Property Office of the People's Republic of China (SIPO) mailed Jun. 12, 2010 from CN Application No. 200680019865.6 with English translation, 11 pgs.

CN Office Action from The State Intellectual Property Office of the People's Republic of China (SIPO) mailed Nov. 2, 2011 from CN Application No. 200680019865.6 with English translation, 14 pgs.

Japanese Office Action dated May 6, 2011 from JP Patent Application No. 2008-504591, (with English translation), 10 pages.

Japanese Office Action dated Dec. 27, 2012 from JP Application No. 2008-504591 (English translation), 2 pages.

Office Action in Canadian Application No. 2,603,743, mailed Jun. 21, 2013, 5 pages.

Office Action in Indian Application No. 1713/MUMNP/2007, dated Jul. 8, 2013, 3 pages.

Office Action in Japanese Application No. 2008-504591, dated May 16, 2013, 4 pages (English translation included).

Office Action in Korean Application No. 2007-7025132 dated Apr. 16, 2013, 7 pages (English translation included).

Office Action in Korean Application No. 2007-7025132 dated Jun. 12, 2012, 17 pages (English translation included).

* cited by examiner

METHOD AND SYSTEM SUPPORTING AUDITED REPORTING OF ADVERTISING IMPRESSIONS FROM VIDEO GAMES

FIELD OF THE INVENTION

The invention relates to gathering of data from remote locations and more particularly to gathering of metrics relating to applications in execution at the remote locations

BACKGROUND OF THE INVENTION

Broadcast television has given rise to many related and ancillary industries. One such industry is the advertising industry. Advertising for television is a specialized industry that relies on past and present data to establish a value for advertisements displayed during a broadcast event. In order to support this advertising model, an entire industry exists to gather and analyse metrics of television viewership.

To this end, audiences are polled relative to their television viewing and statistics relating to viewership are determined. Similarly, each broadcast event such as a television show, television movie, a sporting event, etc., is reviewed to determine the advertisements within those broadcast events. Thus, the actual advertising content and the statistically analysed viewership are independently determined and verified by an organization to determine the metrics used to establish a value for advertisements. These metrics are typically referred to as "audited metrics" as their correctness is asserted by an independent metrics organization that asserts that it has verified the correctness thereof. One such metrics organization is the Nielsen Media Research™, which provides Nielsen® ratings that are, for the most part, audited.

A new medium into which advertising is now being inserted is the medium of video games. As a first generation of in-game advertisements, static product placements—product placements programmed into the game and that remain in the game each time it is played—were used. These first generation advertisements have metrics associated therewith calculated and gathered in a fashion similar to those for television viewership.

Presently, a next generation in game advertisement is being deployed. According thereto, product placements are inserted within video games dynamically such that each time a game is played, different advertisements may appear therein. Unfortunately, existing methods of determining metrics are not suited to function with these next generation in game advertisements. Problematically, the video games are not similar when played—different advertisements may be displayed in each; the video games are not played at a consistent time; and the video games are not played consistently by each player.

It would be advantageous to provide a method of determining metrics for next generation in game advertisements.

SUMMARY OF THE INVENTION

It is an object of the invention to provide a method of determining metrics for next generation in game advertisements.

In accordance with an embodiment of the invention there is provided a method comprising: providing video game software having executable code therein for dynamically inserting advertising data therein from an external source and for reporting data relating to impressions relating to the advertising data; executing the video game on a system for during execution inserting advertising data therein dynamically and for reporting data relating to impressions relating to the advertising data; and, comparing the reported data against impressions made during execution of the game to produce a comparison result.

In accordance with yet another embodiment of the invention there is provided a method comprising: providing video game software having executable code therein for inserting advertising data from an external source therein dynamically and for reporting data relating to impressions relating to the advertising data; executing the video game software on a system for during execution dynamically inserting advertising data therein and for reporting data relating to impressions relating to the advertising data; and, during execution of the video game, reporting the data relating to impressions relating to the advertising data in a secure fashion for avoiding tampering therewith.

In accordance with another embodiment of the invention there is provided a method comprising: providing video game software having executable code therein for dynamically inserting advertising data therein from an external source and for reporting data relating to impressions relating to the advertising data; executing the video game on a system for during execution inserting advertising data therein dynamically and for reporting data relating to impressions relating to the advertising data; and, during execution of the video game, automatically detecting advertising data dynamically inserted within the video game.

In accordance with another embodiment of the invention there is provided a method comprising: executing video game software on a gaming system; verifying a certification of at least a portion of the video game software to determine a first value; and, when the first value is indicative of a valid certification from a certifying body, reporting impression data from the video game software in execution, the reported impression data for being compiled with audited impression data.

In accordance with yet another embodiment of the invention there is provided a method comprising: providing a video game application having a certification thereof from a trusted certification body; executing the video game application; verifying the certification of the video game application as one of reliably certified and other than reliably certified; and, when the certification of the video game application is verified as reliably certified, providing certification data to the video game for use in certifying of reported impression data.

In accordance with yet another embodiment of the invention there is provided a storage medium having stored therein video game software having executable code therein for dynamically inserting advertising data therein from an external source and for reporting data relating to impressions relating to the advertising data; a video game system having an adaptor for coupling with a communication network; and, at least a processor for detecting impressions and for reporting detected impressions and for comparing the reported data against the detected impressions to produce a comparison result.

In accordance with yet another embodiment of the invention there is provided a storage medium having stored therein video game software having executable code therein for inserting advertising data from an external source therein dynamically and for reporting data relating to impressions relating to the advertising data; a video game system having an adaptor for coupling with a communication network; and, at least a processor for reporting impressions in a secure fashion for avoiding tampering therewith.

BRIEF DESCRIPTION OF THE DRAWINGS

Exemplary embodiments of the invention will now be described in conjunction with the attached drawings, in which.

DETAILED DESCRIPTION OF EMBODIMENTS OF THE INVENTION

Hereinbelow, the term impression is used to refer to information impressed upon a user of a system. Typically, impression refers to an advertising impression wherein advertising data is displayed, made audible, or otherwise communicated to an individual in a fashion that is statistically valid from an advertising industry perspective. The verb to impress is used to connote the action of providing an impression.

For the video game industry, audited metrics, if verifiable and available industry wide, would result in a relative advertising/gamer market share for any given game. This gives rise to an in-game analogue to Gross Ratings Points (GRP) as currently used in metrics evaluation. Because the existing advertising industry understands the existing metrics, analogous or comparable metrics are highly advantageous.

Figure 1:
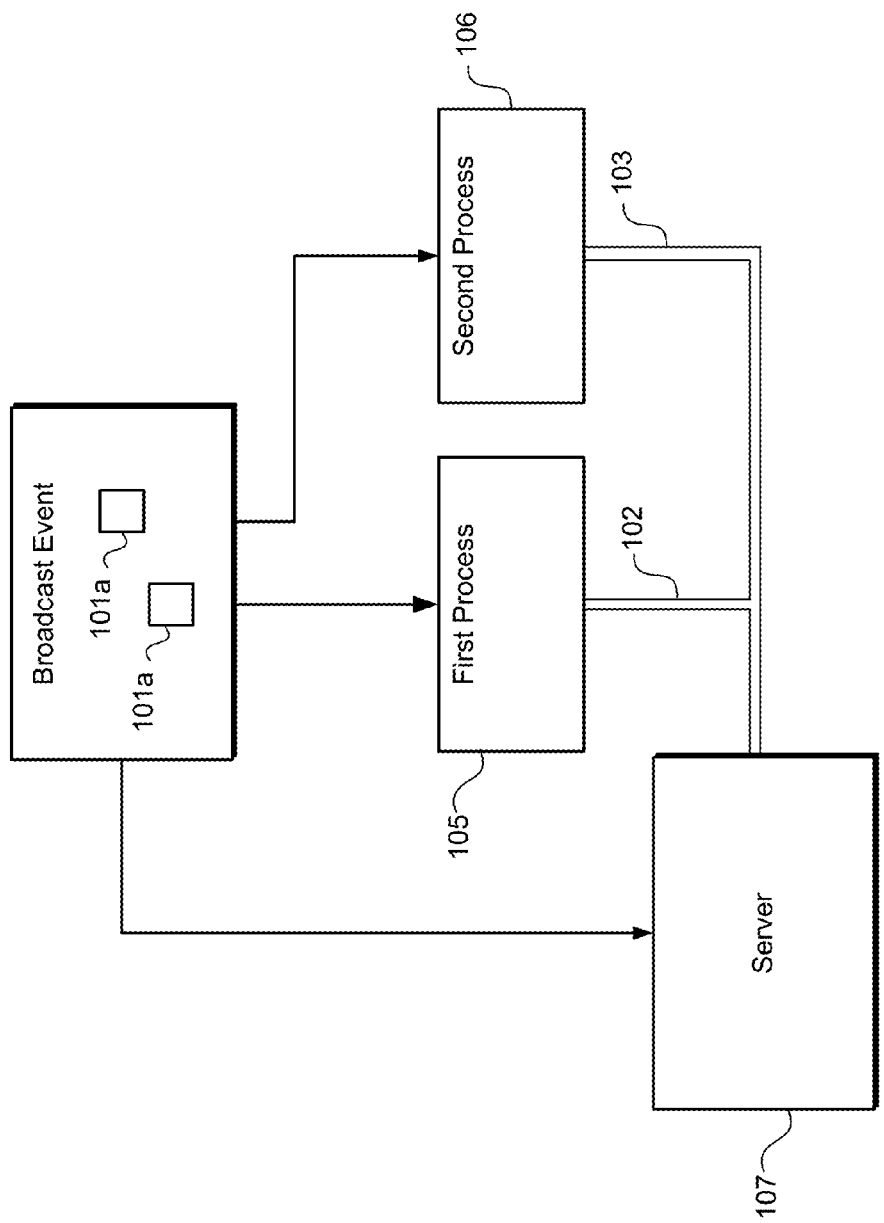
FIG. 1 is a simplified flow diagram of a broadcast event based auditing model.

Referring to FIG. 1, a simplified flow diagram of the broadcast event based auditing model is shown. A broadcast event is displayed at box 101. The broadcast event occupies a length of time in the form of 30 minutes, though other lengths of time are supported. Intermittently during the time of the event, advertisements are shown as at 101a. Each advertisement has a minimum length of time during which it is displayed and is displayed for at least that minimum length of time continuously. During the event, two other processes are being executed. A first process 105 "watches" the event and records the advertisements shown throughout. Though this process used to be performed by individuals, it is now performed automatically using computer software for identifying the advertisements within the event. A second process 106 acts to gather viewership data 103. This second process is in the form of a survey or feedback mechanism for gathering user-viewing statistics.

The advertising viewership data 103 is compiled statistically into tables indicative of advertisement value. This is commonly performed by media research organizations. The tables are then applied to the verified advertisements data 102 to establish a value therefore in a fashion that is now well understood in the media research industry. The viewership data 103 and advertisement data 102 are stored by an external server 107.

Figure 2:
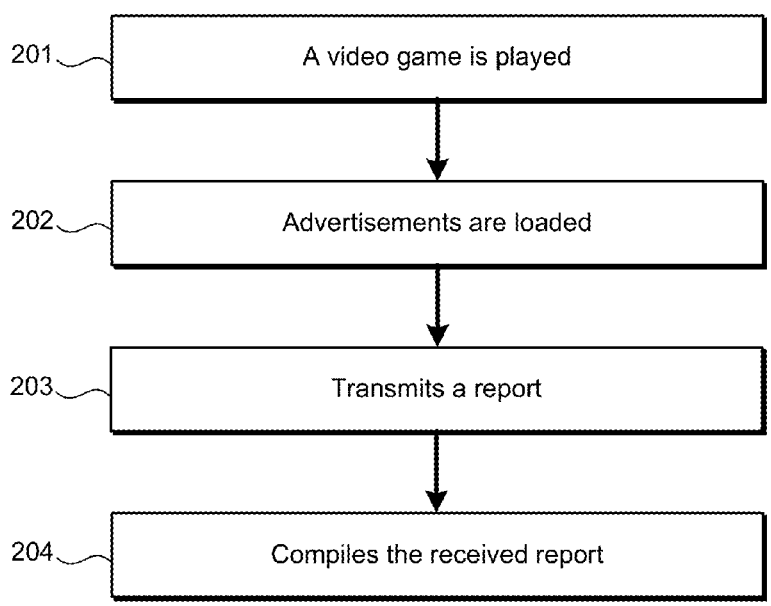
FIG. 2 is a simplified flow diagram of a process for tracking of advertisements displayed within video games.

Referring to FIG. 2, a process for tracking of advertisements displayed within video games is shown. A video game is played on a gaming system in the form of a personal computer, a mobile device, a set top box, or a gaming console at 201. The video game has therein locations for display of advertisements. When the video game is played, advertisements are loaded by the game for display therein 202. Each time a video game is played, different advertisements are optionally displayed. The video game then transmits to a server at 203 at least a report of the advertisements shown during the course of the game. As such, a report of reported "displayed" advertisements and their associated statistical value is provided, thereby greatly reducing the work necessary to statistically evaluate a value of an advertisement. A media research organization at 204, compiles the received report data into appropriate advertising value related reports.

Unfortunately, in a system according to FIG. 2, an unscrupulous video game provider has an ability to report falsely on a number, quality, or value of displayed advertisements. Further, due to the overwhelming amount of reported data when a game is released, identifying this "false" reporting is quite difficult. As another concern, video game providers have an option to upload patches to their games over time. Some of these patches may include "false" reporting or may correct same. As such, the difficulty is significantly complex.

Figure 3:
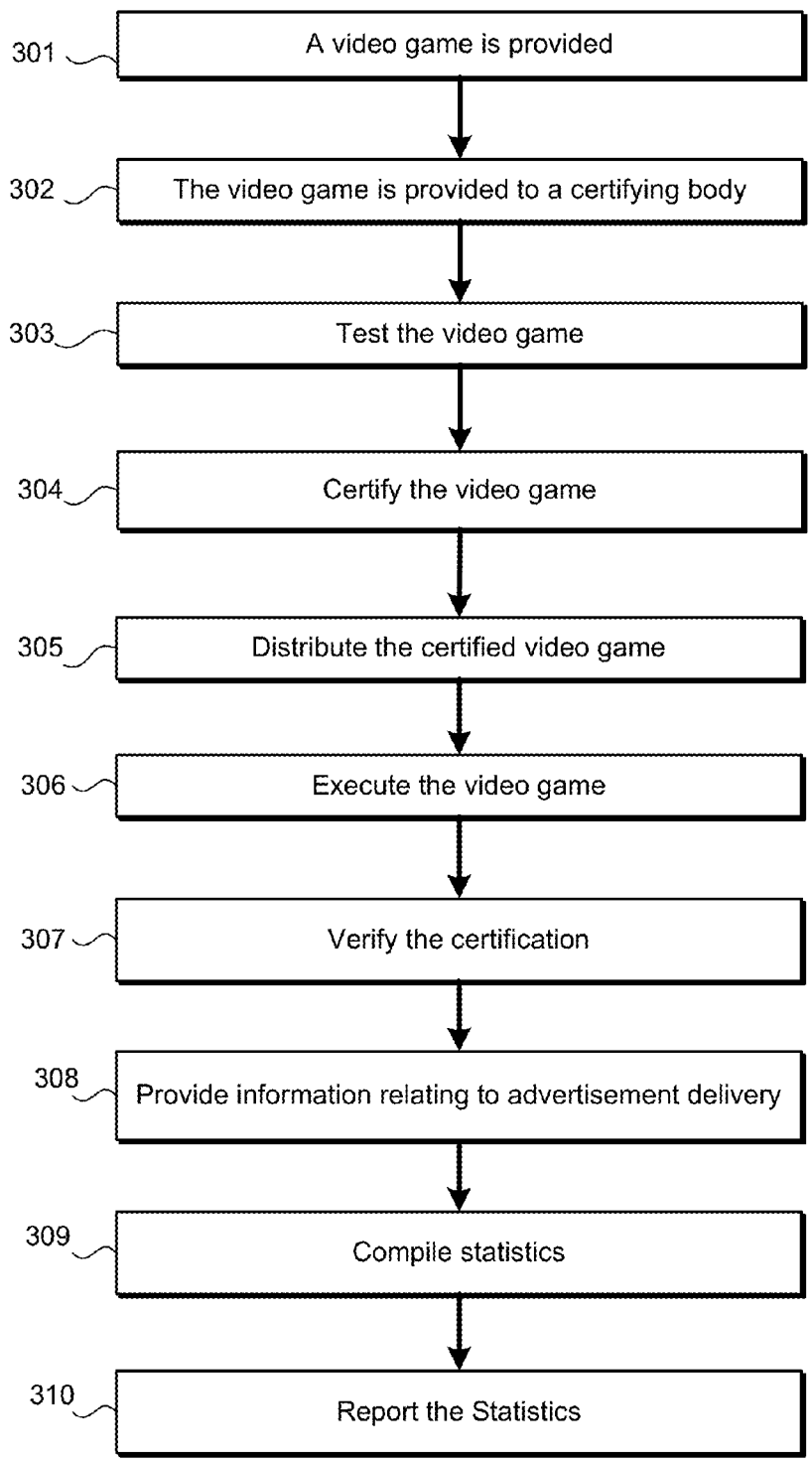
FIG. 3 is a simplified flow diagram of a method for reporting of audited metrics for use in video games.

Referring to FIG. 3, a method of reporting of audited metrics for use in video games is shown. At 301, a video game is provided for having advertisements dynamically delivered thereto. At 302, the video game is provided to a certifying body for certification thereof. For example, a metrics company such as Nielsen® may choose to act as a certifying body for video games. At 303, the certifying body tests the video game to establish that the advertisements displayed therein are accurately reported. At 304, the video game is certified as correctly reporting statistics therefrom. At 305, the certified video game is distributed to gamers. At 306, the video game is executed and at 307 its certification is verified. Once verified, the reported data relating to displayed advertisements is considered trustworthy. As such, at 308 information relating to advertisement delivery is provided from the certified video game. At step 309, statistics relating to advertising in video games are compiled, for example by a media research organization and at 310 those statistics are reported in the form of, for example, an industry report relating to advertising value within video games.

Figure 4:
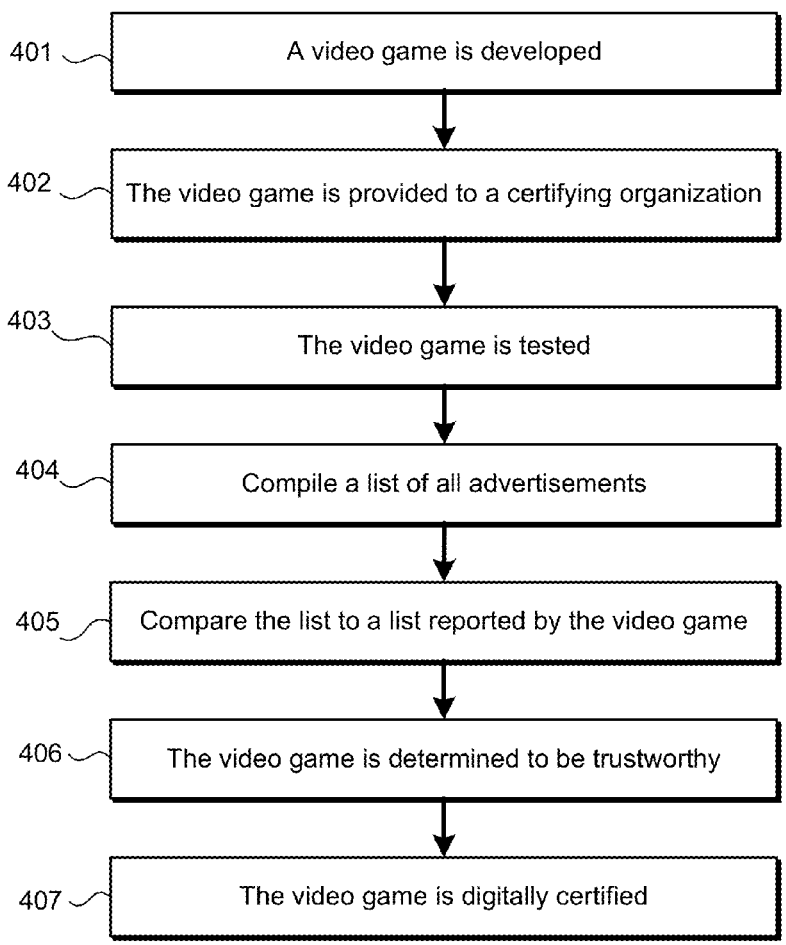
FIG. 4 is a simplified flow diagram of a process for certifying video games.

Referring to FIG. 4, a process for certifying video games is shown. Here, a video game is developed at 401. After completing development and thorough testing of the video game, the video game is provided to a certifying organization, for example a media research organisation, for auditing thereof at 402. The video game is tested at 403 by the certifying organization relying upon an automated advertisement detection process in execution. For example, a program in execution on the auditing system is able to identify advertisements when displayed. Preferably, the advertisement itself is identifiable to ensure accurate reporting of each advertisement displayed. The auditing system compiles a list of all advertisements noted at 404 and compares the list to a list reported by the video game at 405 to ensure accuracy. When the two lists are comparable, the video game is determined to be trustworthy at 406. At 407, the video game is digitally certified as acceptable once it determined to be trustworthy.

In an exemplary embodiment, the advertisements displayed during testing of the video game at 403 are predetermined patterns that are designed or selected for ease of automatic identification. Preferably, the selected patterns are also distinguishable one from another to allow for verification of individual advertisements in individual advertisement locations. Further preferably, the advertisements are automatically generated in response to a request for advertising data such that a process for automatically identifying advertising data when displayed does not require significant storage resources.

In a further embodiment, the automatic detection of advertisement data when displayed is performed by an external system. Such a system, for example is coupled between a gaming system and a display for intercepting data for being displayed. Alternatively, such a system relies on a video capture device such as a video camera to capture video data relating to images presented by a video game during execution thereof. The image data is then analysed in order to extract advertising data that is displayed therein.

Figure 5:
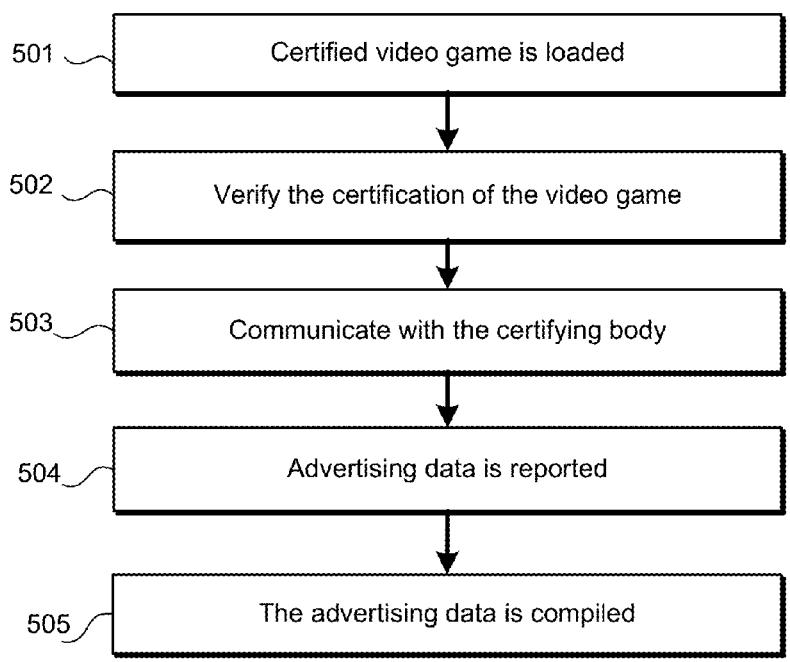
FIG. 5 is a simplified flow diagram of a process for execution of a certified video game and for verifying of the certification of the video game with a separate application.

Referring to FIG. 5, a process for execution of certified video games is shown. The certified video game is loaded onto a game execution system in the form of a personal computer or a gaming console at 501. A second process in execution on the system and independent of the video game acts to verify the certification of the video game 502. For example, the executable game is hashed to establish that it has not been modified since certification thereof. Once verification is complete, the second process communicates with the certifying body at 503 to indicate that reported information from this video game can be included as audited data. At 504, advertising data is reported from the verified video game, and at 505, the advertising data is compiled into a report of audited advertising data. Of course, when verification fails, the data reported by the video game is considered other than trustworthy, though it may be compiled into other reports indicative of unaudited but reported advertising data.

Figure 6:
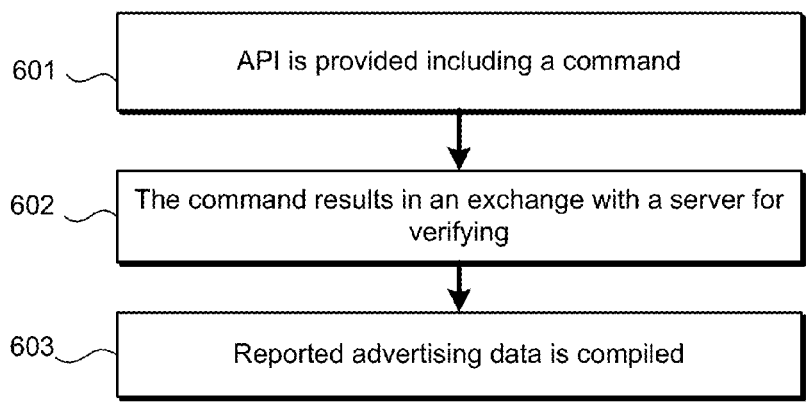
FIG. 6 is a simplified flow diagram of a process for execution of a certified video game and for verifying of the certification of the video game using a command embedded within the video game software.

Referring to FIG. 6, another embodiment for verifying of certification of a video game is shown. Here, an application programming interface (API) is provided at 601 and associated with an object code library. The API and associated object code library comprise at least a command for verifying a version of the video game software application. This at least a command when executed results in an exchange with a server for verifying the certification of the video game application at 602. A video game application that has been certified is verified by the at least a command within the object code library. For example, the at least a command results in hashing of portions of the video game software to produce a hash result. Exchanging of the hash result with a server allows for verification of a certification of the video game software. Alternatively, the entire video game software application is hashed. Preferably, the API has a small footprint. At 603, when the certification is verified, reported advertising data from the video game is compiled with audited reported data results.

Figure 7:
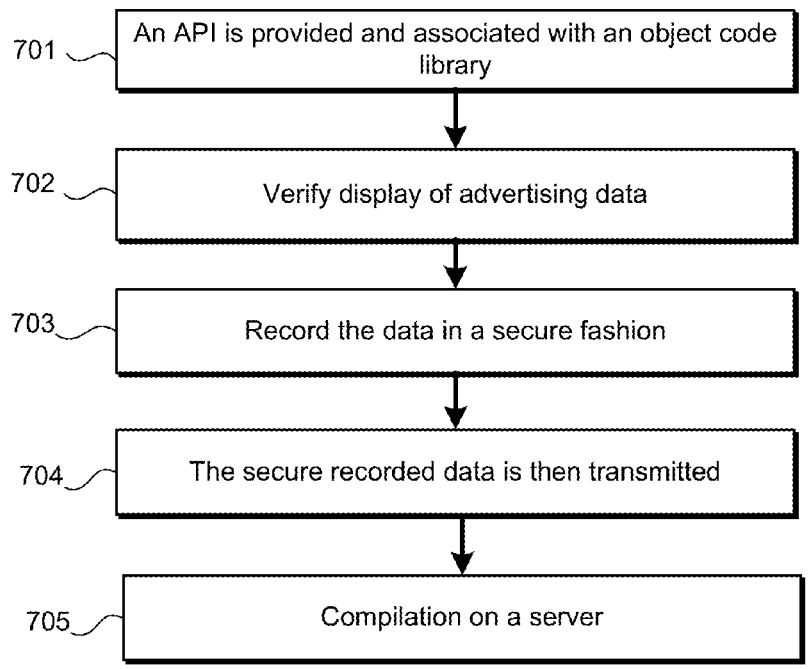
FIG. 7 is a simplified flow diagram of a process for execution of a video game and for verifying of impressions impressed during execution thereof, the verification performed by one of a process executing separately from the video game and software within the video game, the process for certifying of reported impression data.

Referring to FIG. 7, another embodiment is shown. Here, an API is provided and associated with an object code library at 701. The object code library includes at least a command for verifying display of advertisement data within a video game. Thus, the at least a command verifies display of advertising data at 702 and records the data in a secure fashion at 703. The secure recorded data is then transmitted at 704 to a server for compilation thereof at 705. Optionally, the object code library comprises at least a command for verifying the object code library itself to ensure that it is other than modified. Further optionally, the video game software is absent a reporting mechanism other than the reporting mechanism within the object code library. At 706, reported advertising data from the object code library is compiled with audited reported data results. Optionally, when both the object code library and the video game include reporting mechanisms, the reported advertising data is verified by the server to ensure that both reporting mechanisms are in agreement.

For example, advertising data includes tag data therein for being easily identified during impressing thereof. Preferably, any such tag is not noticeable to the gamer during impressing of the advertisement thereon. Alternatively, the process for identifying impressions is provided with the advertising data prior to seeking same to facilitate the accurate and reliable identification of advertising data impressed within a video game during play thereof.

Figure 8:
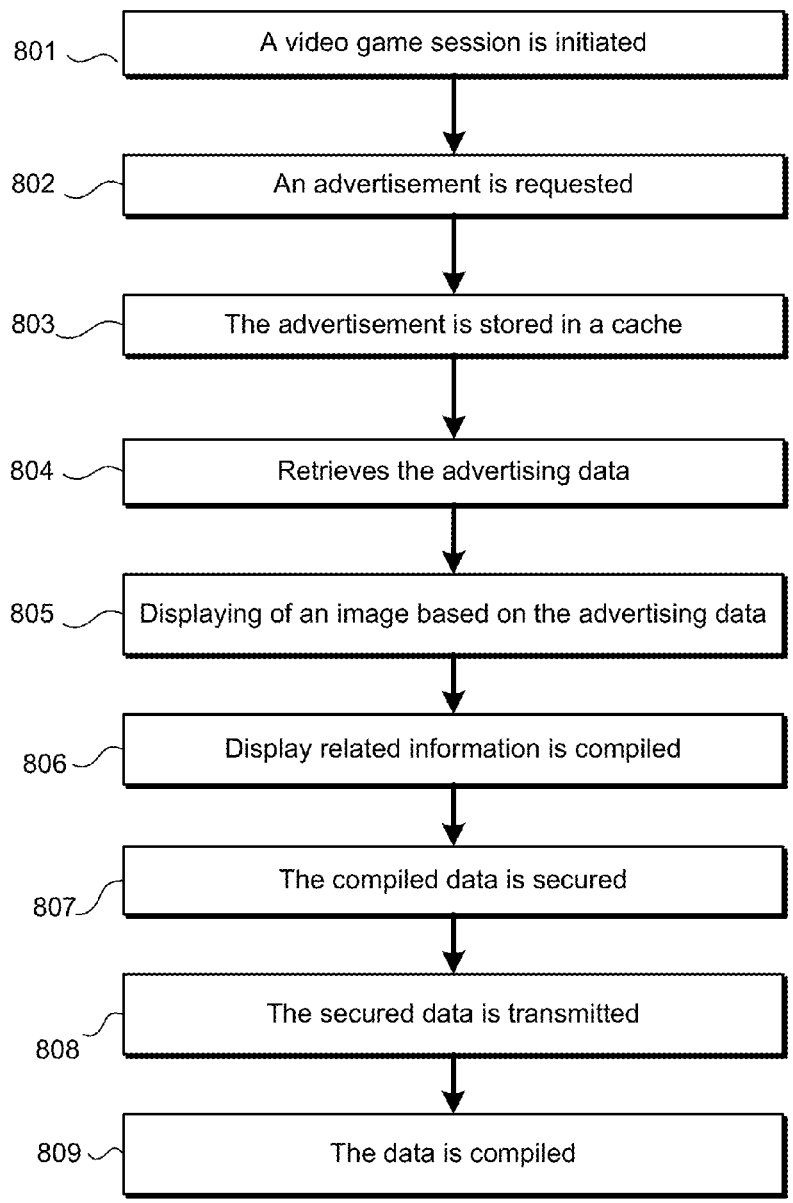
FIG. 8 is a simplified flow diagram of a process for execution of a video game having a certified object code library included therein for retrieving, displaying and reporting of impressions, the object code library for certifying of reported impression data.

Referring to FIG. 8, yet another embodiment is shown. Here, an API is provided and associated with an object code library. The object code library comprises a plurality of commands including at least a command for retrieving advertising content, another command for displaying the advertising content and a command for securely reporting the display of advertising data within a game during play thereof. Thus, the commands perform all tasks relating to advertisement data retrieval, display, and reporting. Optionally, the object code library comprises at least a command for verifying the object code library. In this fashion, certification of the object code library results in audited reporting of advertising data from all video games designed using the object code library.

Referring to the diagram of FIG. 8, a video game session is initiated 801 and an advertisement is requested by the video game in execution at 802. The advertisement when received is stored in a cache managed by the object code library at 803. When the location for display of the advertising data is within view, the object code library retrieves the advertising data from the cache at 804. Commands within the object code library are executed for displaying of an image based on the advertising data within the location at 805. Once displayed, display related information is compiled to be reported at 806. The compiled data is secured at 807. The secured data is transmitted to a server at 808 for compilation thereof with other secured data at 809. Of course, though FIG. 8 is described with reference to advertising image data, other advertising data in the form of video, text, audio data, and so forth are also supported. Alternatively, the reported data is other than secured.

Figure 9A:
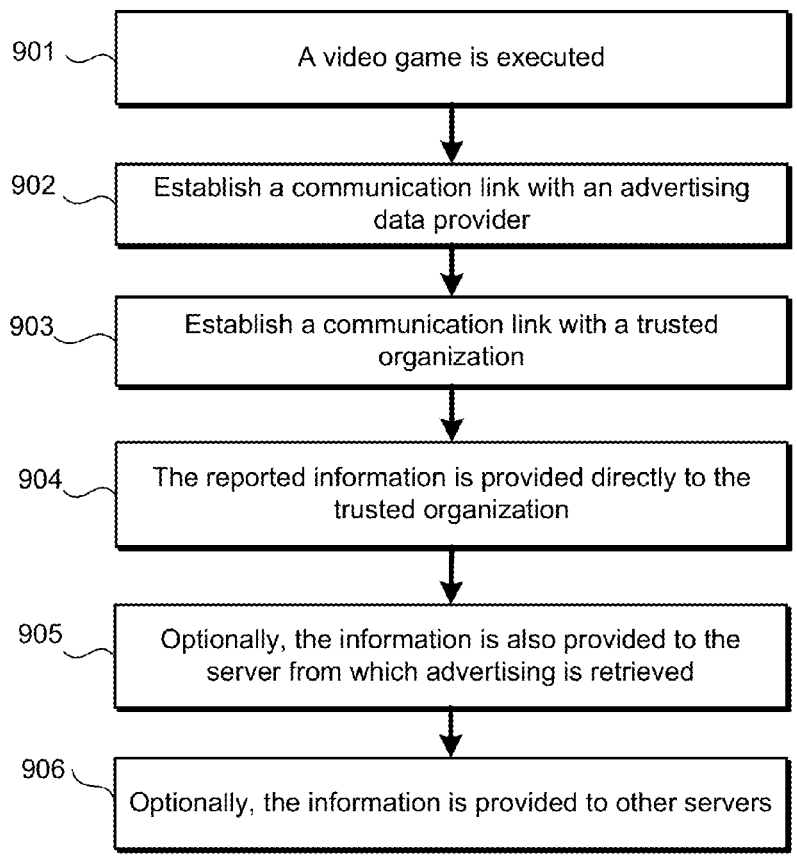
FIG. 9a is a simplified flow diagram of a process for reporting of advertising data wherein the reports are provided from a video game system directly to a certifying organization.

Referring to FIG. 9a, a process for reporting of advertising data is shown wherein the reports are provided from the video game directly to the certifying body to ensure accuracy thereof. Here, by reporting data directly to the certifying body or to a neutral data collection organization, tampering with the data is prevented. Thus, along with a method of verifying accuracy of the reported data, the method of FIG. 9a allows for ensuring of accuracy of the data received. A video game is executed at 901. The video game establishes a communication link with an advertising data provider at 902. The video game establishes a communication link with a trusted organization for compiling of advertising display data at 903. When advertising data is impressed upon a gamer, the reported information is provided directly to the trusted organization at 904. Optionally, as shown at 905, the information is also provided to the server from which advertising data is retrieved. Further optionally, the information is also provided to other servers 906, for example a server of the video game publisher. Once received at a trusted organization, the information is distributed for use in media research.

Figure 9B:
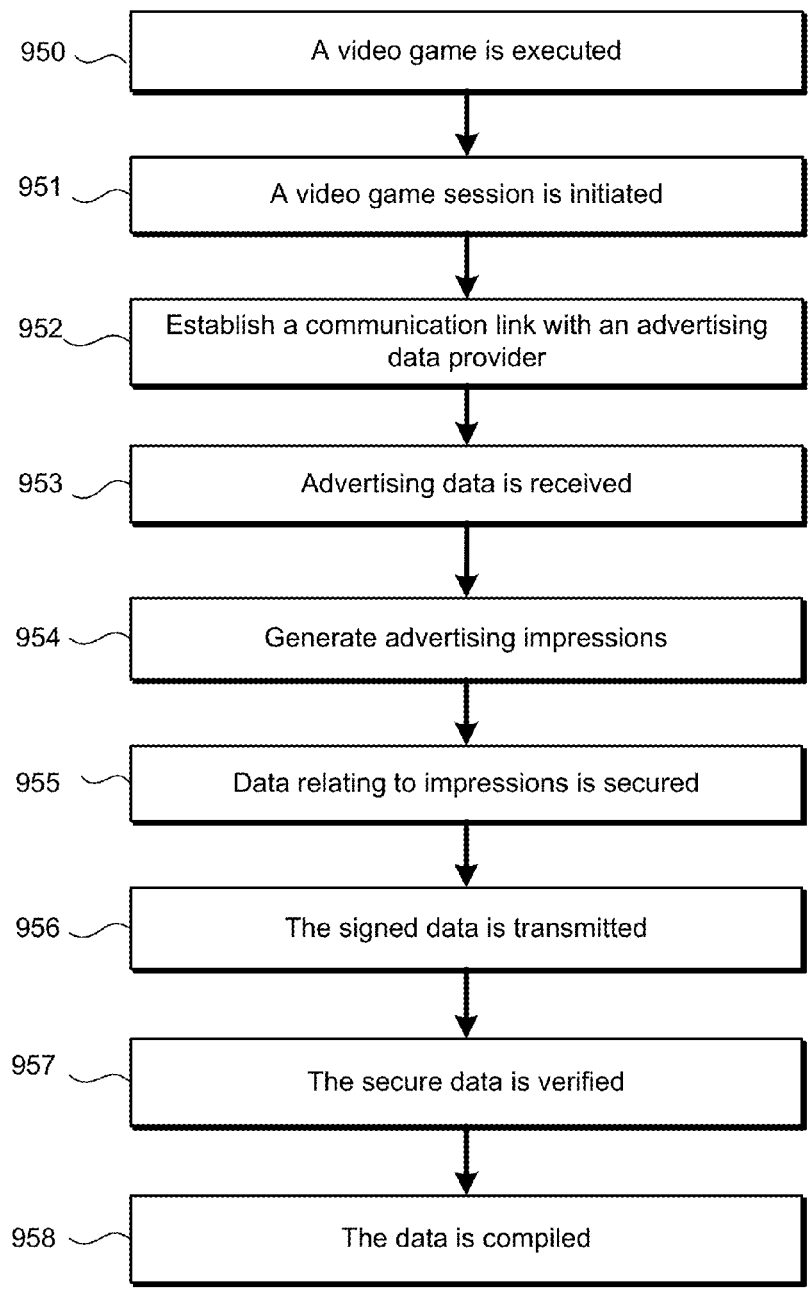
FIG. 9b is a simplified flow diagram of a process for reporting of advertising data wherein the reports are secured by certified video game software prior to transmission to a server.

Referring to FIG. 9b, a process for reporting of advertising data is shown wherein the reports are secured by the certified video game software prior to transmission thereof to ensure accuracy thereof. As shown, at 950 a video game is executed and a video game session is initiated 951. The video game establishes a communication link with an advertising data provider at 952. At 953, advertising data for being reported is received. At 954, the data is used to generate advertising impressions for being impressed upon a gamer playing the video game. At 955, data relating to impressions provided is secured using a public key for signing of the data. At 956, the signed data is transmitted to a server. At the server, the secured data is verified at 957. Once verified, the data is compiled with other data to form advertising impression statistical information at 958.

Figure 10:
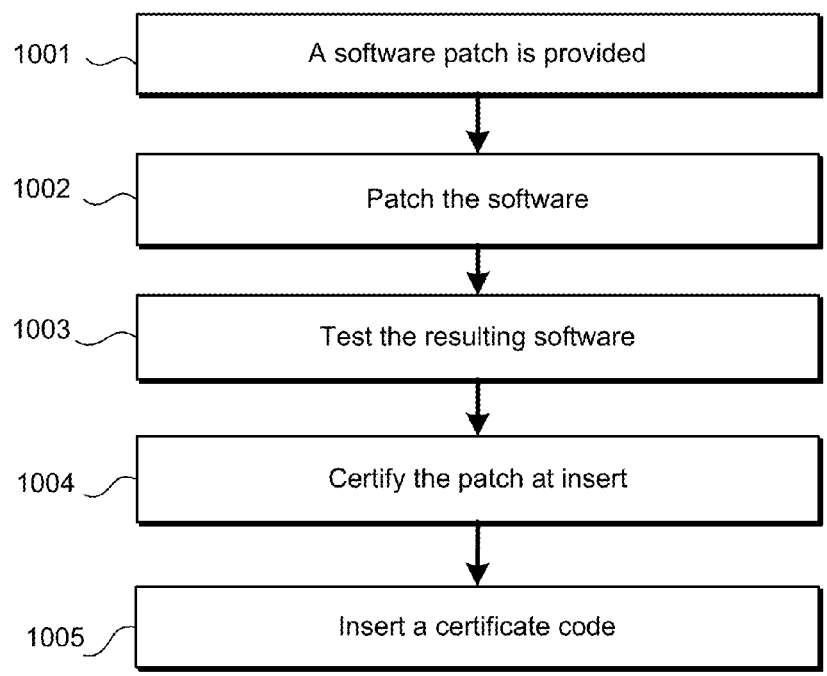
FIG. 10 is a simplified flow diagram of a process for patching of a certified video games.

Referring to FIG. 10, a process for patching of certified video games is shown. Here, the process relies on the above-described methods for certifying of video games. It is significant to note that patches that do not affect certified software within a video game, do not require further certification in accordance with the present invention.

At 1001, a software patch for modifying video game software is provided. A certifying body patches the software with the software patch at 1002 and tests the resulting software at 1003. When the software executes and reports advertising data accordingly, the certifying body certifies the patch at 1004 and inserts within the patch a certification code for use in verifying of the patched software at 1005. In use, patching of the software results in modifications thereto that will still be verified as certified due to the further testing thereof. Alternatively, when the method of FIG. 7 or 8 is used, the certifying body merely verifies that the object code library is unaffected by the patch. When the object code library is affected by the patch, the object code library as patches is retested and re-certified.

Figure 11:
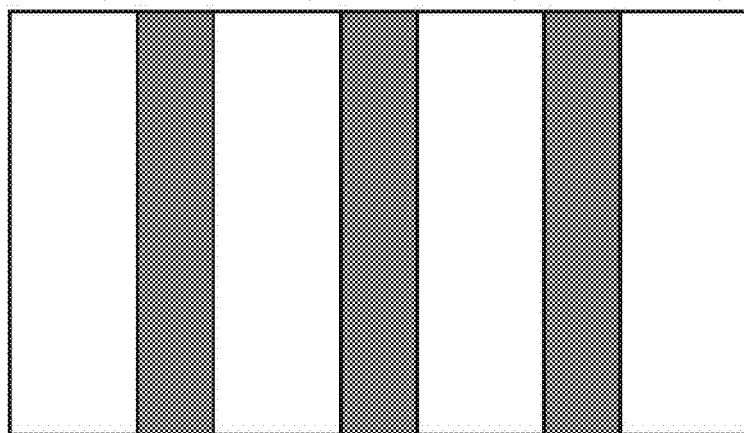
FIG. 11, some examples of identifiable advertisement patterns are shown.
Figure 11:
Figure 11:
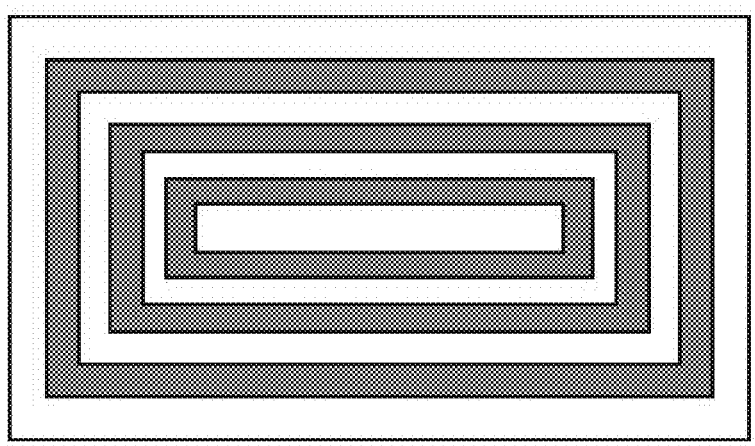
Figure 12:
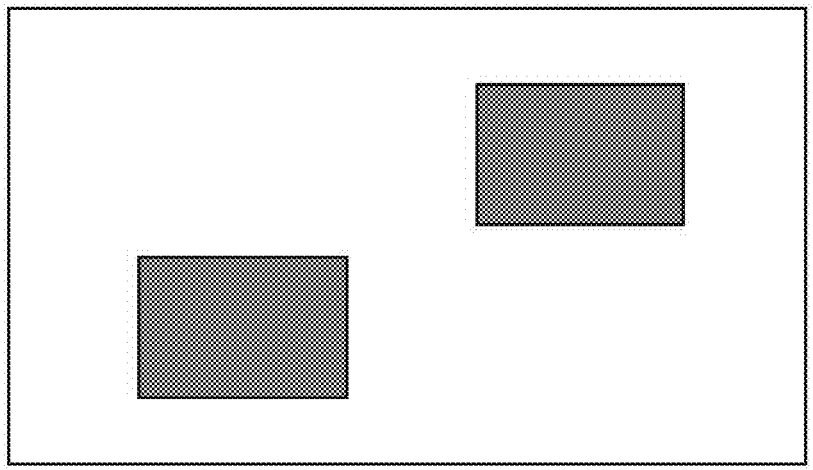
FIG. 12 shows a plurality of patterns for advertisements including an identifiable portion and a separate distinguishing portion.
Figure 12:
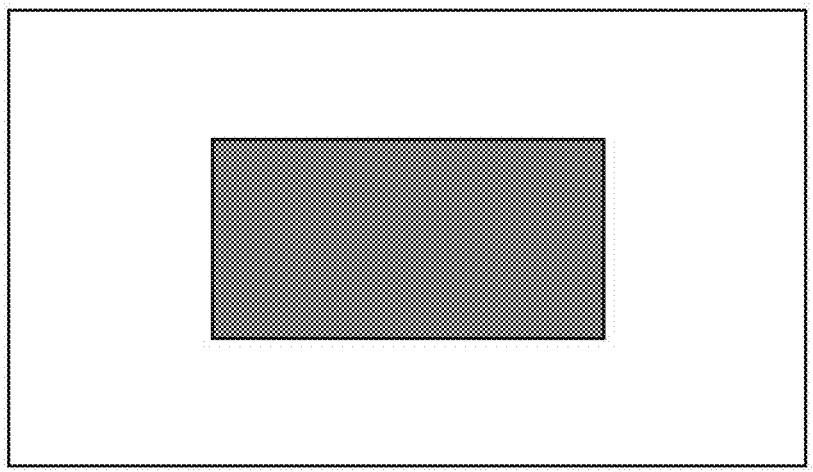

Referring to FIG. 11, some examples of identifiable advertisement patterns are shown. A simple pattern for identification includes a colour pattern that repeats itself in an identifiable fashion such that stretching, perspective, wrapping, contouring, etc. of the image data renders the resulting image identifiable. By varying the colour content of the pattern, a similar pattern is reusable many times, each time with a different colour sequence. Alternatively, a recurring pattern is overlaid on a standard advertising pattern such as a neutral colour background resulting in easy identification of the area of neutral colour and then the pattern is merely used to distinguish between advertisements as shown in FIG. 12.

Though the above descriptions rely on reporting of advertising impressions to a server, the impressions are optionally aggregated prior to reporting thereof. Further optionally, the impression data is stored in a secured fashion prior to aggregation thereof to prevent tampering therewith. For example, an object code library that is trusted is used to secure and aggregate the data prior to transmission thereof.

In an embodiment, an audit log is generated for being provided to the server. As such, when content is auditable and when auditing of data is performed, then records provided to the server include audit data for use in verifying auditing of the advertisement impressions. When used with a method such as those of FIGS. 7 and 8, such an audit portion allows for spot audits of video games that are other than directly accessible by the certifying organization. In accordance with such an embodiment, each record includes a portion provided by the object code library and relating to identification and tracking of impressions during execution of a video game.

Alternatively, the audited data indicates a degree of correlation between the reported data and the auditing results thereby resulting in an indication of reliability of the reported data. Though 100% is such an indication, it is also possible to have lesser percentage reliability and to still be considered trustworthy, from a statistical perspective. Application of the method of the invention for use in evaluating trustworthiness of reported impression data is supported according to the above embodiments. For example, if the reporting is reporting fewer impressions than those shown, disagreement between the reports and the audited values results in enhanced trustworthiness. Even a few reported values that are missing from the audited results may simply indicate errors in the auditing process. As such, the correlation requirements between the audited and reported data is a matter left to those of skill in the art of media research and statistics.

Though the above embodiments are described with reference to video games, those skilled in the art will recognize that the methods and systems described hereinabove are also applicable to other software applications for displaying and reporting of advertising data and or other commercial data for display thereon.

It is for those of skill in the art of media research to determine whether all advertising locations require auditing thereof or only a subset requires auditing. Further, it is possible to audit video game performance on a regular basis, at random intervals, or in a continuous uninterrupted fashion.

Numerous other embodiments may be envisaged without departing from the spirit or scope of the invention.

What is claimed is:

1. A method comprising:

monitoring, by an auditing system comprising one or more computers, an executing video game to identify actual advertisement impressions produced during the execution of the video game, the video game executing on the auditing system and having executable code therein for dynamically inserting advertising data into the video game, the auditing system comprising a gaming system executing the video game and a display for displaying display data generated by the executing video game, wherein monitoring the executing video game comprises:

intercepting, by an auditing process coupled between the gaming system and the display executing on the auditing system and being independent from the video game, display data generated by the video game during the execution of the video game, wherein intercepting the display data comprises intercepting display data generated by the video game and intended for display on the display, and analyzing, by the auditing process, the intercepted display data generated by the video game to identify advertisement impressions included in the intercepted display data;

receiving a report from the video game, the report including data identifying advertising data reported by the video game as having been inserted in the video game for display during the execution of the video game on the auditing system;

comparing, by the auditing system, the data identifying advertising data reported by the video game as having been inserted in the video game against the actual advertisement impressions identified from the intercepted display data generated by the video game by the auditing processing independent from the video game to produce a comparison result; and certifying, by the auditing system, the video game when the comparison result is indicative of accurate reporting of impressions by the video game.

2. A method according to claim 1, comprising providing advertising data to the video game during execution thereof, the advertising data for producing impressions that can be detected automatically by the auditing process when included in the display data generated by the video game.

3. A method according to claim 2, wherein the advertising data is different for different forms of advertising.

4. A method according to claim 3, wherein the different forms of advertising relate to a type of placement within the video game.

5. A method according to claim 3, wherein the different forms of advertising relate to a value of the forms of advertising.

6. A method according to claim 3, wherein each advertising datum is different to allow for specific auditing of each placement of advertising data within the video game during execution thereof.

7. A method according to claim 2, wherein the advertising data is for forming a simple repeating pattern that is identifiable, the simple repeating pattern for being detected automatically by the auditing process.

8. A method according to claim 2, wherein the advertising data is for forming a first impression and an identifiable pattern detectable by the auditing process.

9. The method of claim 1 wherein the advertising data comprises advertising data from an external source.

10. The method of claim 1, further comprising providing the certified video game for distribution to at least one gamer.

11. A method for auditing advertisements in a video game comprising:

detecting, by an auditing system comprising one or more computers and monitoring an output of a video game, a presentation of actual advertisements dynamically inserted within the video game while the video game is running on the auditing system, wherein the auditing system comprises a gaming system running the video game and a display for displaying display data generated by the executing video game, wherein detecting the presentation of actual advertisements comprises:

intercepting, by an auditing process coupled between the gaming system and the display executing on the auditing system and being independent from the video game, display data generated by the video game during the execution of the video game, wherein intercepting the display data comprises intercepting display data generated by the video game and intended for display on the display, and analyzing, by the auditing process, the intercepted display data generated by the video game to identify advertisements included in the intercepted display data;

obtaining a report from the video game of advertisements reported by the video game as having been inserted into the video game during execution of the video game on the auditing system;

comparing, by the auditing system, the advertisements identified by the auditing system with the advertisements reported by the video game to determine a degree of accuracy of the report; and certifying, by the auditing system, the video game according to the determined degree of accuracy.

12. The method of claim 11, wherein the certifying comprises hashing at least a portion of the video game.

13. The method of claim 11, wherein the video game comprises a video game with a patch; and wherein the certifying comprises certifying the patch.

14. The method of claim 11, further comprising obtaining the advertisements from an external source; and inserting the advertisements dynamically within the video game.

15. The method of claim 11, further comprising:

inserting the advertisements dynamically within the video game, each advertisement having a detectable unique predetermined pattern; and wherein the analyzing comprises detecting the unique predetermined pattern of each advertisement in the display data.

16. The method of claim 11, further comprising providing the certified video game for distribution to at least one gamer.

17. A system comprising: a storage medium having stored therein video game software having executable code therein for dynamically inserting advertising data therein from an external source and for reporting data identifying impressions relating to the advertising data;

a video game system having an adaptor for coupling with a communication network, the video game system configured to run the video game software; and, at least a processor operable to execute second software different from the video game software, wherein executing the second software causes the processor to detect actual impressions produced by the video game system when running the video game software, wherein detecting actual impressions comprises:

intercepting, by an auditing process coupled between the video game system and a display for displaying display data generated by the video game, display data generated by the video game system while running the video game software, wherein intercepting the display data comprises intercepting display data generated by the video game and intended for display on the display, and analyzing the intercepted display data generated by the video game to identify impressions of advertisements included in the intercepted display data;

obtain a report from the video game system of advertising data reported by the video game system as having been inserted in the video game software, compare the advertising data reported by the video game system as having been inserted in the video game software against the detected actual impressions identified from the display data produced by the video game system when running the video game software to produce a comparison result, and certifying the video game software when the comparison result is indicative of accurate reporting of impressions by the video game.

18. A non-transitory computer-readable medium encoding a computer program product operable to cause data processing apparatus to perform operations comprising:

monitoring an output of a video game to detect the actual presentation of advertisements dynamically inserted within the video game, wherein monitoring the output of the video game comprises:
intercepting, by an auditing process coupled between a video game system and a display for displaying display data generated by the video game, display data generated by the video game during the execution of the video game, wherein intercepting the display data comprises intercepting display data generated by the video game and intended for display on the display, and
analyzing, by the auditing process, the intercepted display data generated by the video game to identify advertisements included in the intercepted display data;
obtaining a report from the video game of advertisements reported by the video game as having been inserted into the video game;
comparing the advertisements identified from the intercepted display data generated by the video game with the advertisements reported by the video game as having been inserted into the video game to determine a degree of accuracy of the report; and
certifying the video game for producing audited reports of inserted advertisements.

19. The computer-readable medium of claim 18 wherein the certifying comprises hashing at least a portion of the video game.

20. The computer-readable medium of claim 18,
wherein the video game comprises a video game with a patch; and
wherein the certifying comprises certifying the patch.

21. The computer-readable medium of claim 18, the operations further comprising:
inserting the advertisements dynamically within the video game, each advertisement having a detectable unique predetermined pattern; and
wherein the detecting comprises detecting the unique predetermined pattern of each advertisement.

* * * * *